United States Patent Office

3,175,984
Patented Mar. 30, 1965

3,175,984
PREVENTING AGGLOMERATION WHILE DISPERSING PIGMENTS IN VINYL CHLORIDE-VINYL ACETATE COPOLYMER RESIN
Marlow H. Paulson, Jr., Fanwood, and William A. Dimler, Jr., Rahway, N.J., assignors to Esso Research and Engineering Company, a corporation of Delaware
No Drawing. Filed Dec. 14, 1961, Ser. No. 159,449
3 Claims. (Cl. 252—62.5)

This invention relates to the art of preparing pigment-resin dispersions of high solids content.

It is known to disperse pigments in the presence of various resins for the preparation of coatings and the like. The pigment may be magnetic, e.g., ferromagnetic oxide, in which case it may be used in magnetic record members, such as tape, ribbon, disc, cylinder or the like. If the pigment is non-magnetic, the resultant pigment-resin grind may be used in various decorative coating compositions or the like.

Regardless of the use, it is often desirable to prepare pigment dispersions of high solids content. However, when using copolymers of vinyl chloride and vinyl acetate as the resin, difficulties are encountered in obtaining such a dispersion. Often no dispersion is obtained when the pigment and resin are ground together with the pigment present in high proportions, because of pigment agglomeration, etc.

It has now been discovered that these difficulties can be overcome by incorporating a small amount of an air-blown polymer of a $C_4$ to $C_6$ conjugated diolefin or copolymer thereof with an ethylenically unsaturated compound such as styrene in the vinyl chloride-vinyl acetate copolymers.

The polymers to which the present invention are applicable are oily polymers of butadiene, isoprene, dimethylbutadiene, piperylene, methylpenetadiene or other conjugated diolefins having 4 to 6 carbon atoms per molecule. Instead of polymerizing any of the aforesaid diolefins alone, they may be copolymerized in mixtures with each other or in admixtures with minor amounts of ethylenically unsaturated monomers copolymerizable therewith, e.g., with 5-30% styrene, styrenes having alkyl groups substituted on the ring such as paramethyl styrene, dimethyl styrene, diethyl styrene, acrylonitrile, methacrylonitrile, methyl acrylate, methyl methacrylate, vinyl isobutyl ether, methyl vinyl ketone, and isopropyl methyl ketone. Such synthetic oils may be advantageously prepared by mass polymerization, either in the presence of a hydrocarbon soluble peroxide catalyst, such as benzoyl peroxide or cumene hydroperoxide or in the presence of metallic sodium. Suitable polymerization methods are illustrated below. Throughout the present description it will be understood that all proportions are expressed on a weight basis unless otherwise specified.

SYNTHESIS METHOD A

For example, 100 parts of butadiene-1,3, 50 parts of straight-run mineral spirits boiling between 150° and 200° C. (Varsol), 3 parts of tertiary butyl hydroperoxide (60% pure) and 0.75 part of diisopropyl xanthogen disulfide are heated in a closed reactor at about 90° C. for 40 hours whereupon the residual pressure is released and the unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some tertiary butyl alcohol. This solution of polymer is then preferably fractionated to remove the dimer and usually adjusted to 50% non-volatile matter content. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U.S. patent application, Serial No. 782,850 of Arundale et al., filed on October 29, 1947, now Patent No. 2,586,594, which describes alternative monomers, catalysts, reaction diluents, polymerization modifiers, suitable ranges of proportions of the various ingredients, suitable ranges of polymerization conditions, etc.

SYNTHESIS METHOD B

An alternative polymerization method using sodium as catalyst is illustrated as follows: 80 parts of butadiene-1,3, 20 parts of styrene, 200 parts of straight-run mineral spirits boiling between 150° and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or other anhydrous organic acid, and filtered. Instead of neutralizing the alcohol treated product, the acid may also be added directly to the crude product containing residual metallic sodium and the latter destroyed by the acid. The colorless filtrate is then fractionally distilled to remove the alcohol and modifiers such as dioxane. Finally, additional hydrocarbon solvent is preferably distilled off until a product containing about 50-95% non-volatile matter is obtained, the non-volatile matter being a drying oil having a molecular weight below 10,000, preferably between about 2,000 and 5,000.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having 3 to 8 carbon atoms such as methyl ethyl ether, dibutyl ether or phenetole; or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about −15° and 250° C., preferably between 60° and 200° C., e.g., butane, benzene, xylene, naphtha, cyclohexane, and the like. The diluents are usually used in amounts ranging from 50 to 500 parts per 100 parts of monomer. The reaction temperature may vary between about 40° C. and 100° C., preferably around 65° to 85° C. As a catalyst, 0.1 to 10 parts of dispersed metallic sodium is used per 100 parts of monomers, sodium particle sizes below 100 microns being particularly effective.

The blowing of the above polymeric drying oils with air or oxygen is best carried out in a solvent of moderate to good solvency, e.g., solvents or solvent mixtures having a Kauri-Butanol value of at least 40. At least a substantial portion of aromatic solvent is generally needed to secure such a KB value, and such aromatic content is highly beneficial in promoting oxygen uptake during the blowing treatment. It also aids materially in permitting high oxygen contents to be secured in the treatment without encountering the instability which induces gelation of the mass being treated. Other strong solvents, such as oxygenated solvents, have similar benefits. While mixtures of high and low KB value solvents are generally useful, the oil can be dissolved in strong solvent(s) from the start, thereby eliminating low solvency solvents. The choice of solvents will, of course, depend on the oxygen content which is desired in the finished oil as well as on the formulations of the coating compositions which are to be made from the blown oil, and in the interest of economy it is generally desirable to use the cheapest solvent(s) which possess the needed attributes of Kauri-Butanol value and compatibility with the various ingredients of the finished coating vehicle which is to be formulated.

Examples of suitable solvents include aromatic or mixtures of aromatic and aliphatic hydrocarbons boiling up to about 250° C. The aromatic solvent may be benzene, toluene, hemimellitene, pseudocumene, mesitylene, propyl benzene, cymene, ethyl toluene, methyl ethyl benzene, xylenes, Solvesso-100 (a mixture of aromatic hydrocarbons boiling from about 150° to 175° C.), Solvesso-150 (a mixture of aromatic hydrocarbons boiling from about 190° to 210° C.), or mixtures thereof. Other suitable solvents include the Varsols which are straight-run mineral spirits boiling in the range of 140° to 205° C., having API gravities of 40 to 55 and varying in aromatic content from 5 to 35 weight percent.

Catalysts suitable for the oxidation reaction of this invention include organic salts of metals such as the naphthenates, octoates, and other hydrocarbon soluble metal salts of cobalt, lead, iron and manganese. These catalysts are used in amounts ranging from 0.001% to 1.0%. Peroxide such as benzoyl peroxide and the like may be added to reduce the induction period.

It is understood that conditions of temperature and time of reaction, ratio of reactants, degree of dilution, presence or lack of solvents and the like will depend upon factors including the degree of oxidation desired and the nature of the starting polymer; therefore, it is not intended that the invention be limited by the specific conditions and examples herein set forth as it is intended to illustrate and not limit the invention.

The nature of the oxidized diolefin polymer depends largely upon the extent of oxidation which in turn depends on various factors including time of oxidation, temperature, presence or absence of catalyst, type of solvent, etc. In general, greater extent of oxidation results in a lower solubility of the oxidized polymer in paraffin hydrocarbon solvents. The oxidation can be carried out such that the product is soluble in paraffinic hydrocarbons indicating that the oxidation has proceeded to a relatively slight extent. The oxidation can also be carried out so that the product is insoluble in paraffinic solvents but is completely soluble only in aromatic solvents indicating that the oxidation has proceeded to a high degree. The percent of oxygen in the product will vary according to the conditions from a trace to 20% or more.

According to the present invention, a resin such as the copolymer of vinyl chloride and vinyl acetate, or the like, is mixed with 75 to 90 weight percent of a pigment and dispersed in any suitable mill in the additional presence of 3 to 5 weight percent of the above-described oxidized polymer. The dispersion can be achieved by the use of a ball mill or any other standard equipment which will disperse the pigment.

The following example is presented to illustrate the effect of the invention. All quantities are expressed in this specification and claims on a weight basis unless otherwise stated.

*Example*

Separate mixtures were prepared of 80 wt. percent magnetic iron oxide and 20% vinyl chloride-vinyl acetate copolymer (A), and a mixture of 80 wt. percent magnetic iron oxide, 16% vinyl copolymer and 4% polymer made in accordance with synthesis B and air blown to contain 16% weight oxygen (B). The dispersion was accomplished by placing ⅓ of a pint of each mixture in a pint ball mill provided with ⅜ in. steel balls and milling for eighteen hours. The following data were obtained.

IMPROVEMENT WITH OXIDIZED POLYMER

| Formulation | A | | B | |
|---|---|---|---|---|
| | Total, g. | Non-volatile, g. | Total, g. | Non-volatile, g. |
| $Fe_2O_3$ (magnetic) | 125 | 125 | 125 | 125 |
| Vinyl copolymer [1] | 31 | 31 | 24.8 | 24.8 |
| Oxidized polymer (45% solids) | | | 13.8 | 6.2 |
| Methyl isobutyl ketone | 43 | | 40.9 | |
| Toluene | 115 | | 109.5 | |
| Pigment Weight Content Wt., percent | 80 | | 80 | |
| Fineness of dispersion: | | | | |
| Particle size, mils | (2) | | 0.5 | |
| North Scale (0–8) (coarse-fine) | | | 7 | |

[1] Union Carbide VAGH—vinyl chloride-acetate copolymer described as 91% vinyl chloride, 3% vinyl acetate and 2.6 hydroxyl containing monomer.
[2] No dispersion obtained.

The nature of the present invention having been thus fully set forth, what is claimed as new and useful and desired to be secured by Letters Patent is:

1. In a process for preparing high solids pigmented coating compositions in which a mixture of 75 to 90 wt. percent of a pigment is dispersed with a 10 to 25 wt. percent of a vinyl chloride-vinyl acetate copolymer resin, the method of preventing agglomeration during said dispersing which comprises carrying out said dispersing in the presence of 3 to 5 wt. percent, based on total resin pigment mixture, of a liquid oily polymer of a $C_4$ to $C_6$ conjugated diolefin which has been blown with air in the presence of a hydrocarbon solvent until the oxygen content is at least 16 wt. percent.

2. The process of claim 1 in which the liquid oxidized oily polymer is a copolymer of 80% by weight of butadiene and 20 wt. percent styrene.

3. The process of claim 2 in which the pigment is magnetic iron oxide.

References Cited by the Examiner

UNITED STATES PATENTS 2,586,594   2/52   Arundale et al. _____ 260—680
2,721,185   10/55  Schulze _____ 260—33.6
2,834,750   5/58   Salyer et al. _____ 260—33.6

FOREIGN PATENTS 582,787   9/59   Canada.

MAURICE A. BRINDISI, *Primary Examiner.*
JOSEPH R. LIBERMAN, *Examiner.*